US007308111B2

(12) United States Patent
Doudnikov et al.

(10) Patent No.: US 7,308,111 B2
(45) Date of Patent: Dec. 11, 2007

(54) APPARATUS AND METHOD FOR DISPLAYING THREE-DIMENSIONAL IMAGE

(75) Inventors: Sergey Doudnikov, St. Petersburg (RU); Serguei Gorelik, St. Petersburg (RU); Anton Karklit, St. Petersburg (RU)

(73) Assignee: LG Electronics Inc., Seoul (KR)

( * ) Notice: Subject to any disclaimer, the term of this patent is extended or adjusted under 35 U.S.C. 154(b) by 577 days.

(21) Appl. No.: 09/853,044

(22) Filed: May 11, 2001

(65) Prior Publication Data

US 2002/0006213 A1   Jan. 17, 2002

(30) Foreign Application Priority Data

May 12, 2000   (KR) .............................. 2000-25381

(51) Int. Cl.
*G06K 9/00* (2006.01)
(52) U.S. Cl. ...................... 382/103; 382/154; 345/6; 348/169
(58) Field of Classification Search ............... 382/103, 382/154, 284, 285; 345/6, 7, 419; 359/630; 348/169
See application file for complete search history.

(56) References Cited

U.S. PATENT DOCUMENTS

| 5,388,990 | A | * | 2/1995 | Beckman .................... 434/38 |
| 5,579,026 | A | * | 11/1996 | Tabata ......................... 345/8 |
| 5,608,850 | A | * | 3/1997 | Robertson .................. 345/427 |
| 5,703,717 | A | * | 12/1997 | Ezra et al. .................. 359/462 |
| 5,841,439 | A | * | 11/1998 | Pose et al. .................. 345/418 |
| 5,886,675 | A | * | 3/1999 | Aye et al. ...................... 345/7 |
| 5,917,460 | A | * | 6/1999 | Kodama ........................ 345/8 |
| 5,936,774 | A | * | 8/1999 | Street ........................ 359/630 |
| 6,014,164 | A | * | 1/2000 | Woodgate et al. ............ 348/51 |
| 6,075,557 | A | * | 6/2000 | Holliman et al. ............. 348/51 |
| 6,177,966 | B1 | * | 1/2001 | Masuda et al. ................ 349/8 |

(Continued)

FOREIGN PATENT DOCUMENTS

EP   0 726 482 A2   8/1996

(Continued)

*Primary Examiner*—Matthew C. Bella
*Assistant Examiner*—Shefali Patel
(74) *Attorney, Agent, or Firm*—Ked & Associates, LLP

(57) ABSTRACT

An apparatus and method for displaying a three-dimensional image provides a three-dimensional image having a wide viewing angle and having no distortion. The apparatus includes an aspectogram containing a plurality of two-dimensional microimages displayed in real time, a microlens array for synthesizing the two-dimensional microimages and regenerating them in a three-dimensional image, a head tracking system for tracing movement of an observer head that observes the three-dimensional image, in real time, a head position detector for calculating the position of the observer head traced by the head tracking system, an aspectogram regeneration engine for regenerating the microimages in accordance with a signal input from the head position detector to compensate distortion of the three-dimensional image, and a viewing adjust engine for adjusting a viewing zone of the three-dimensional image by moving the regenerated microimages to form a new viewing zone centered relative to the moved observer head in accordance with a signal input from the head position detector and the aspectogram regeneration engine. Thus, the three-dimensional image having no distortion can be observed without limitations imposed by a restricted size of the viewing zone.

6 Claims, 5 Drawing Sheets

U.S. PATENT DOCUMENTS

| | | | |
|---|---|---|---|
| 6,278,546 B1 * | 8/2001 | Dubin et al. | 359/452 |
| 6,329,963 B1 * | 12/2001 | Chiabrera et al. | 345/6 |
| 6,473,238 B1 * | 10/2002 | Daniell | 359/622 |
| 6,501,468 B1 * | 12/2002 | Kaji | 345/419 |
| 6,549,650 B1 * | 4/2003 | Ishikawa et al. | 382/154 |
| 6,795,241 B1 * | 9/2004 | Holzbach | 359/463 |

FOREIGN PATENT DOCUMENTS

| | | |
|---|---|---|
| JP | 60-222839 | 11/1985 |
| JP | 64-73330 | 3/1989 |
| JP | 9-160144 | 6/1997 |
| WO | WO 94/06249 | 3/1994 |

* cited by examiner

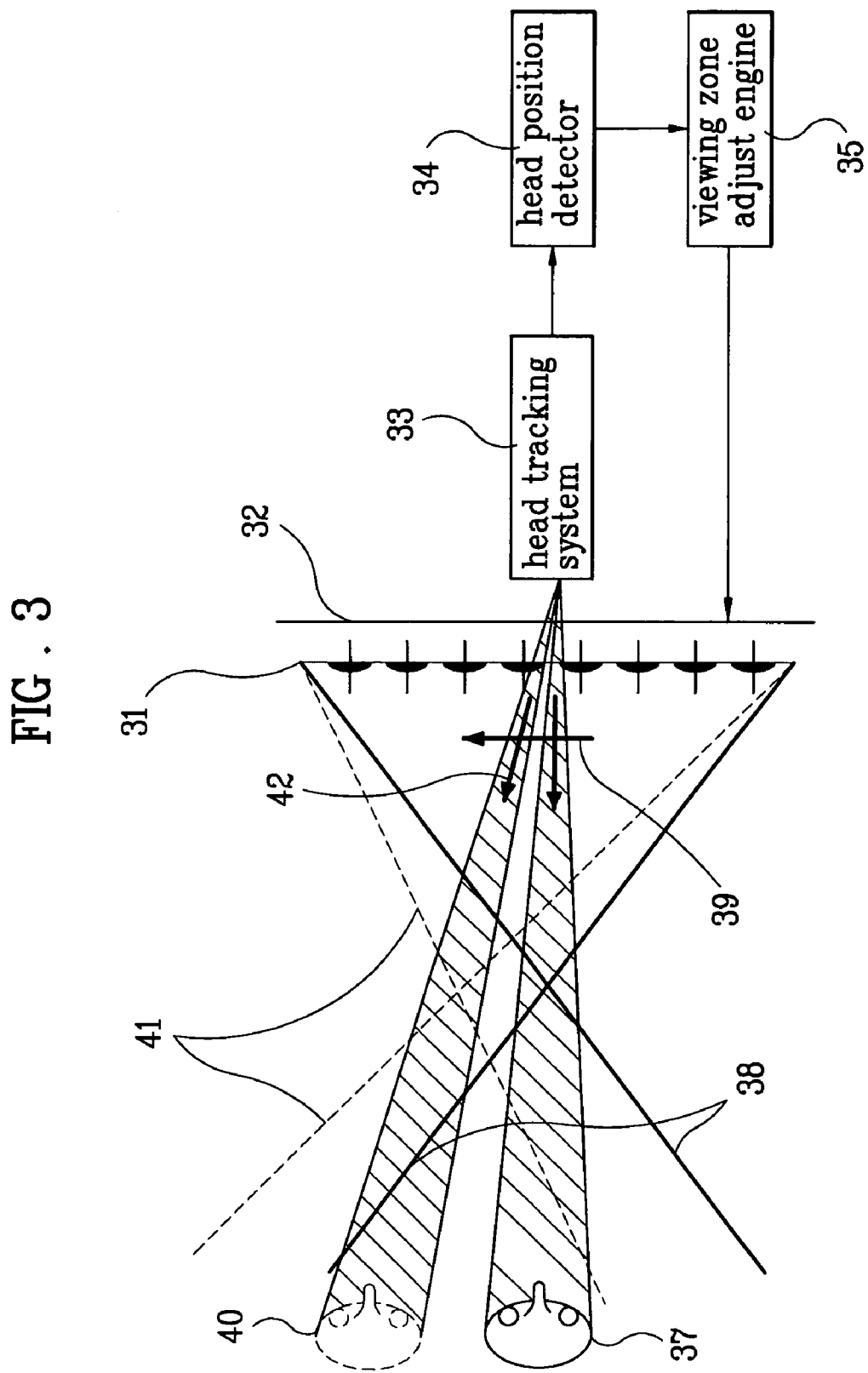

APPARATUS AND METHOD FOR DISPLAYING THREE-DIMENSIONAL IMAGE

BACKGROUND OF THE INVENTION

1. Field of the Invention

The present invention relates to an apparatus and method for displaying a three-dimensional image in real time.

2. Description of the Related Art

Recently, a three-dimensional image processing technology is used in various fields such as education, training, medical treatment, and computer games. The three-dimensional image is more useful than a two-dimensional image in that it has presence feeling, real feeling, and natural feeling.

Many researches for implementing such a three-dimensional image display are currently in progress.

The three-dimensional image display requires various technologies such as input technology, processing technology, transmission technology, display technology, and software technology. Particularly, it essentially requires researches for the display technology, digital image processing technology, computer graphic technology, and human visual system.

The most fundamental method of the three-dimensional image display is based on glasses. As typical examples, there are a color separation mode, a polarized glasses mode, and a liquid crystal shutter mode. The color separation mode permits a viewer to observe images through color glasses using different light wavelengths. The polarized glasses mode is based on different light oscillation directions. The liquid crystal shutter mode permits a viewer to observe left and right images by temporally dividing the images.

The glasses-based three-dimensional image display method provides picture quality of high definition but has two drawbacks. The one drawback arises from inconvenience caused by wearing glasses and the other drawback arises in that only scenographic feeling exists in a fixed visual point. For these reasons, researches for direct three-dimensional image display without wearing glasses are currently in progress.

The direct three-dimensional image display separates left and right images without using glasses, especially separates images corresponding to left and right eyes in a particular observation position using a parallax barrier, a lenticular plate, or a fly eye lens plate.

Particularly, an integral photography mode is well known. This integral photography mode records, transmits, and regenerates three-dimensional images formed by a fly eye shaped microlens array.

In more detail, as shown in FIG. 1, a microlens array 10 having fly eye shaped microlens arrays 11 is arranged, and a number of microimages 13 of a subject entered through each microlens 11 are recorded on a printing paper in a microimage focus surface 12.

If light is illuminated at the rear of the printing paper, respective microimages 13 recorded on the printing paper progress in the same path as when the subject is taken, so that a three-dimensional image 14 is regenerated in an original subject position.

However, a comfortable viewing zone that can observe the regenerated three-dimensional image is limited to a boundary of the three-dimensional image 14.

For example, a viewing angle of a two-dimensional display based on a cathode ray tube (CRT), a plasma display panel (PDP), and a liquid crystal display (LCD) is approximate to 120 but a viewing angle of a three-dimensional display such as an integral photography is about 20° or less.

FIGS. 2a and 2b show three-dimensional images observed in a zone other than inside and outside of a viewing angle of an apparatus for displaying a three-dimensional image.

As shown in FIG. 2a, two-dimensional microimages are provided on a screen 22. The microimages are synthesized to a three-dimensional image 23 through a microlens array 21 and then regenerated. At this time, an observer 24 located within a boundary 25 of a main viewing zone 26, i.e., within a viewing angle of the apparatus for displaying a three-dimensional image can observe the regenerated three-dimensional image 23.

The viewing angle $2\omega$ that can observe the regenerated three-dimensional image 23 is limited to the boundary of the three-dimensional image.

As shown in FIG. 2b, if an observer 27 moves out of the main viewing zone 26 marked by dotted lines, he is entering into a satellite viewing zone 29 remarked by solid lines.

The observer 27 observes a satellite image 28 in the satellite viewing zone 29. The satellite image 28 is observed within the viewing angle $2\omega$, as shown in FIG. 2a.

The satellite image 28 observed in the satellite viewing zone 29 is similar to the image 23 observed in the main viewing zone of FIG. 2a. However, the satellite image 28 has a seriously distorted three-dimensional image. This is because that an angle between vertical and horizontal directions in the regenerated satellite image 28 is different from an angle of the regenerated image 23 of FIG. 2a.

As described above, the related art apparatus for displaying a three-dimensional image has a problem in that the viewing angle that can stably observe a three-dimensional image is narrow. For this reason, another problem arises in that the apparatus for displaying a three-dimensional image is limited in its use range.

SUMMARY OF THE INVENTION

To solve the above problems, an object of the present invention is to provide an apparatus and method for displaying a three-dimensional image in real time, in which a three-dimensional image having no distortion out of a viewing zone can stably be observed.

To achieve the above object, an apparatus for displaying a three-dimensional image according to the present invention, which synthesizes two-dimensional microimages and regenerates them in a three-dimensional image, includes a detector for tracing movement of an observer head that observes the three-dimensional image, in real time and detecting the position of the observer head, and a compensator for adjusting a viewing zone of the three-dimensional image and/or compensating distortion of the three-dimensional image in accordance with a signal input from the detector.

The detector includes a head tracking system which traces movement of the observer head in real time, and a head position detector for calculating the position of the observer head traced by the head tracking system. The compensator includes either a viewing zone adjust engine which adjusts the viewing zone of the three-dimensional image by moving the microimages in accordance with a signal input from the head position detector, or an aspectogram regeneration engine which compensates distortion of the three-dimensional image by regenerating the microimages in accordance with the signal input from the head position detector.

To further achieve the above object, an apparatus for displaying a three-dimensional image according to the present invention includes an aspectogram containing a plurality of two-dimensional microimages displayed in real time, a microlens array for synthesizing the two-dimensional microimages and regenerating them in a three-dimensional image, a head tracking system for tracing movement of an observer head that observes the three-dimensional image, in real time, a head position detector for calculating the position of the observer head traced by the head tracking system, and a viewing adjust engine for adjusting a viewing zone of the three-dimensional image by moving the microimages in accordance with a signal input from the head position detector.

The apparatus further includes an aspectogram regeneration engine which regenerates the microimages in accordance with the signal input from the head position detector to compensate distortion of the three-dimensional image. Also, the regenerated microimages are moved to form a viewing zone centered relative to the observer head by the viewing adjust engine.

To further achieve the above object, an apparatus for displaying a three-dimensional image according to the present invention includes an aspectogram containing a plurality of two-dimensional microimages displayed in real time, a microlens array for synthesizing the two-dimensional microimages and regenerating them in a three-dimensional image, a head tracking system for tracing movement of an observer head that observes the three-dimensional image, in real time, a head position detector for calculating the position of the observer head traced by the head tracking system, and an aspectogram regeneration engine for regenerating the microimages in accordance with a signal input from the head position detector to compensate distortion of the three-dimensional image.

The apparatus further includes a viewing adjust engine which adjusts a viewing zone of the three-dimensional image by moving the regenerated microimages to form the viewing zone centered relative to the observer head in accordance with a signal input from the head position detector and the aspectogram regeneration engine.

To further achieve the above object, a method for displaying a three-dimensional image according to the present invention, which synthesizes two-dimensional microimages and regenerates them in a three-dimensional image, includes the steps of tracing movement of an observer head that observes the three-dimensional image, in real time, calculating the position of the traced observer head, and adjusting a viewing zone of the three-dimensional image and/or compensating distortion of the three-dimensional image, in accordance with the calculated position of the observer head.

The step of adjusting the viewing zone of the three-dimensional image includes the step of moving the main viewing zone to be centered relative to the observer head by moving the two-dimensional microimages. The step of compensating distortion of the three-dimensional image includes the step of regenerating the two-dimensional microimages.

In the operation of the apparatus for displaying a three-dimensional image, if the observer head moves out of the viewing zone, the head tracking system traces movement of the observer head and transmits a resultant signal to the aspectogram regeneration engine and the viewing adjust engine. The aspectogram regeneration engine regenerates the microimages so as not to be distorted even in the position of the moved observer head. The viewing adjust engine moves the regenerated microimages to form the viewing zone centered relative to the observer head so that the three-dimensional image having no distortion can be observed from an arbitrary head position, thereby obtaining a wide and comfortable viewing angle.

It is to be understood that both the foregoing general description and the following detailed description are exemplary and explanatory and are intended to provide further explanation of the invention as claimed.

BRIEF DESCRIPTION OF THE DRAWINGS

Other objects, characteristic features and advantages of the present invention will now become apparent with a detailed description of an embodiment made with reference to the accompanying drawings, in which:

FIGS. 3 to 5 show apparatuses for displaying a three-dimensional image according to the first to third embodiments of the present invention.

DETAILED DESCRIPTION OF PREFERRED EMBODIMENTS

Figure 1:
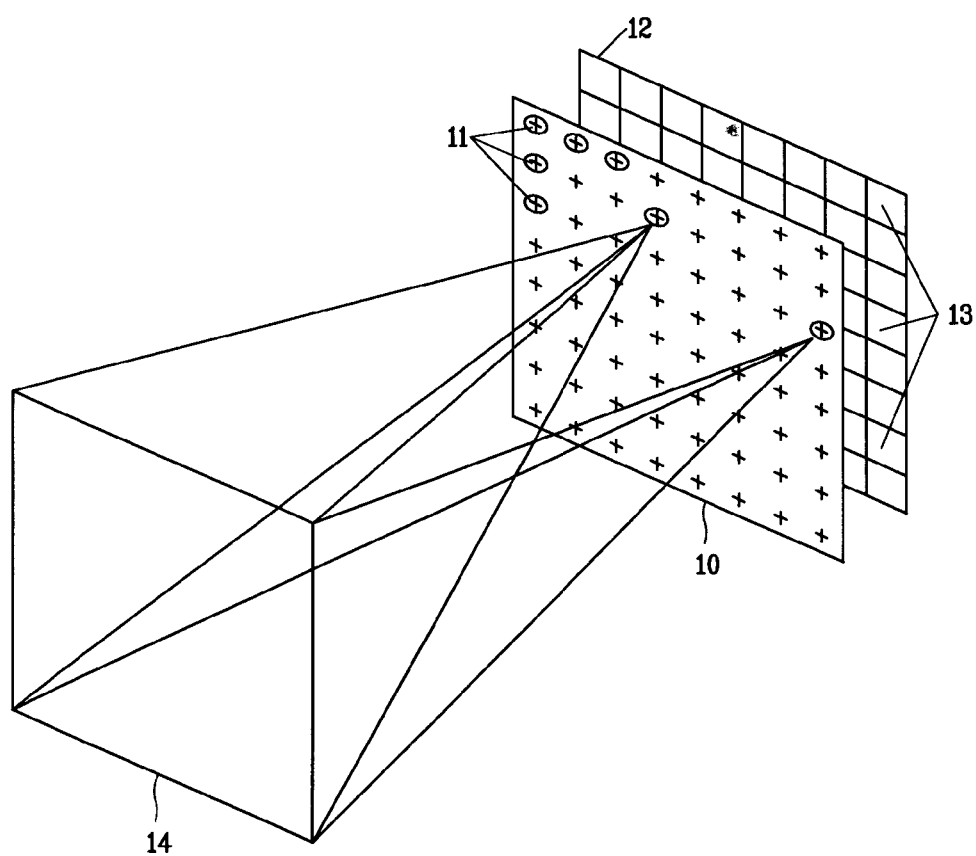
FIG. 1 shows a method for displaying a general three-dimensional image.
Figure 2A:
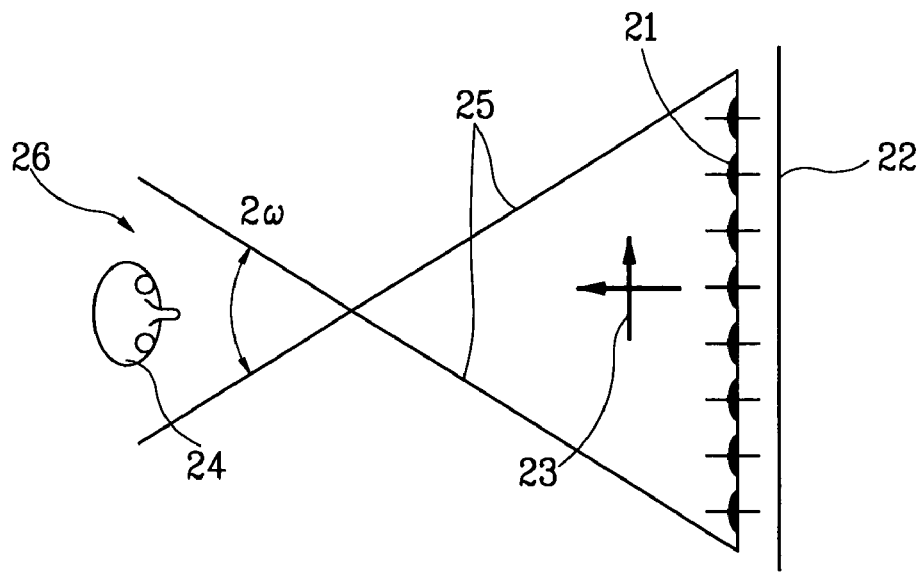
FIG. 2 shows three-dimensional images regenerated in accordance with movement of an observer head in a related art apparatus for displaying a three-dimensional image.
Figure 2B:
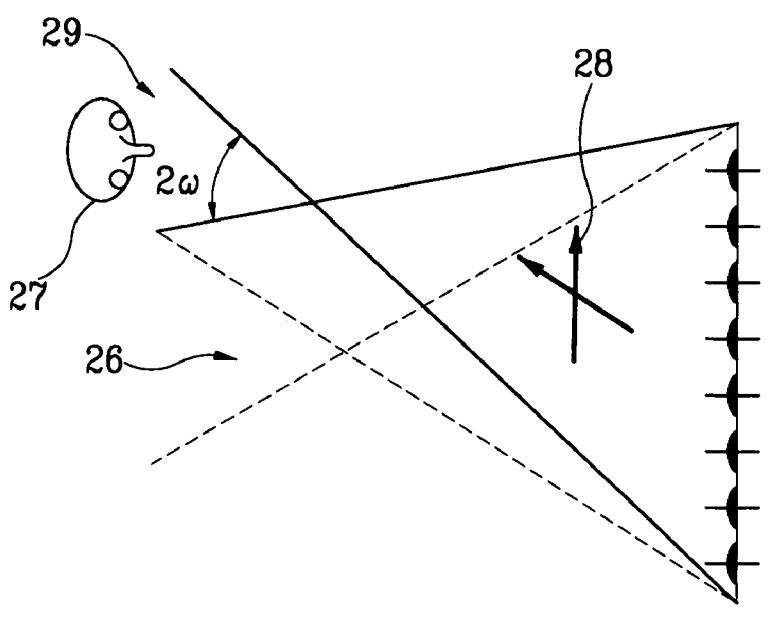

The following is a detailed description of a preferred embodiment of an apparatus and method for displaying a three-dimensional image according to the present invention made with reference to the accompanying drawings.

FIG. 3 shows an apparatus for displaying a three-dimensional image according to the first embodiment of the present invention.

As shown in FIG. 3, an aspectogram containing two-dimensional microimages is provided on a screen 32. The microimages are synthesized to a three-dimensional image 39 through a microlens array 31 and then regenerated. At this time, the apparatus for displaying a three-dimensional image according to the first embodiment of the present invention further includes a head tracking system 33, a head position detector 34, and a viewing adjust engine 35, unlike the related art.

The head tracking system 33 traces movement of an observer head that acts to observe the three-dimensional image, in real time. The head position detector 34 calculates the position of the observer head traced by the head tracking system 33. The viewing adjust engine 35 moves the microimages to form a new viewing zone centered relative to the observer head in accordance with a signal input from the head position detector 34, so that the viewing zone of the three-dimensional image is adjusted.

The operation of the apparatus for displaying a three-dimensional image according to the first embodiment of the present invention will now be described.

If the observer head 40 moves from the center of a main viewing zone to a boundary 38 of the main viewing zone, the head tracking system 33 traces movement of the observer head and transmits a resultant signal to the head position detector 34.

The head position detector 34 calculates the position of the observer head in accordance with the signal of the head tracking system 33, and then transmits the calculated signal to the viewing adjust engine 35.

The viewing adjust engine 35 moves the microimages displayed on the screen 32 in accordance with an input signal so that the viewing zone is adjusted to correspond to the position of a new observer head 40.

A new viewing zone arising from movement of the observer head 40 is shown in dotted lines 41.

The method for adjusting the viewing zone according to the first embodiment of the present invention provides a viewing zone that can stably observe a three-dimensional image even if the observer head 40 moves. However, in this method, a three-dimensional image 42 having some distortion is still observed.

Figure 4:
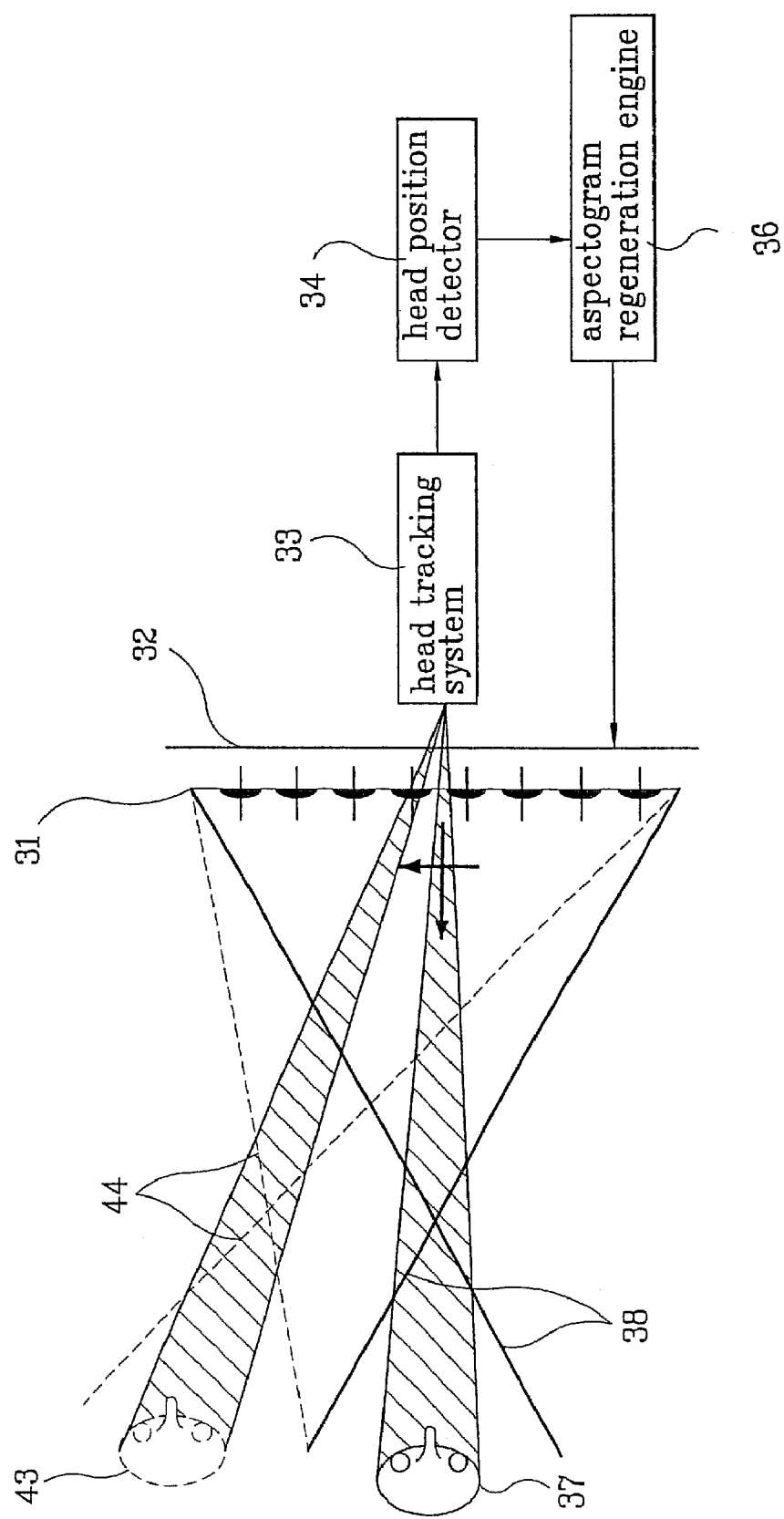

FIG. 4 shows an apparatus for displaying a three-dimensional image according to the second embodiment of the present invention. In the second embodiment of the present invention, instead of the viewing adjust engine 35, an aspectogram regeneration engine 36 is additionally provided. The aspectogram regeneration engine 36 regenerates the aspectograms in accordance with a signal input from the head position detector 34 to compensate distortion of the three-dimensional image.

The operation of the apparatus for displaying a three-dimensional image according to the second embodiment of the present invention will now be described.

If an observer head 43 departs from a boundary 38 of a limited main viewing zone 38 and moves to a boundary 44 of a satellite viewing zone, the head tracking system 33 detects movement of the observer head in real time and transmits a resultant signal to the head position detector 34.

The head position detector 34 calculates the position of the observer head in accordance with the signal of the head tracking system 33, and then transmits the calculated signal to the aspectogram regeneration engine 36.

The aspectogram regeneration engine 36 regenerates the microimages displayed on the screen 32 in accordance with the input signal in new microimages of which distortion is compensated.

As described above, the observer can observe a three-dimensional image having no distortion even in a satellite viewing zone other than a main viewing zone due to regeneration of the microimages of which distortion is compensated.

However, since the viewing zone that can stably observe the three-dimensional image in accordance with movement of the observer is not provided, it is likely that the three-dimensional image is biased to one direction.

Figure 5:
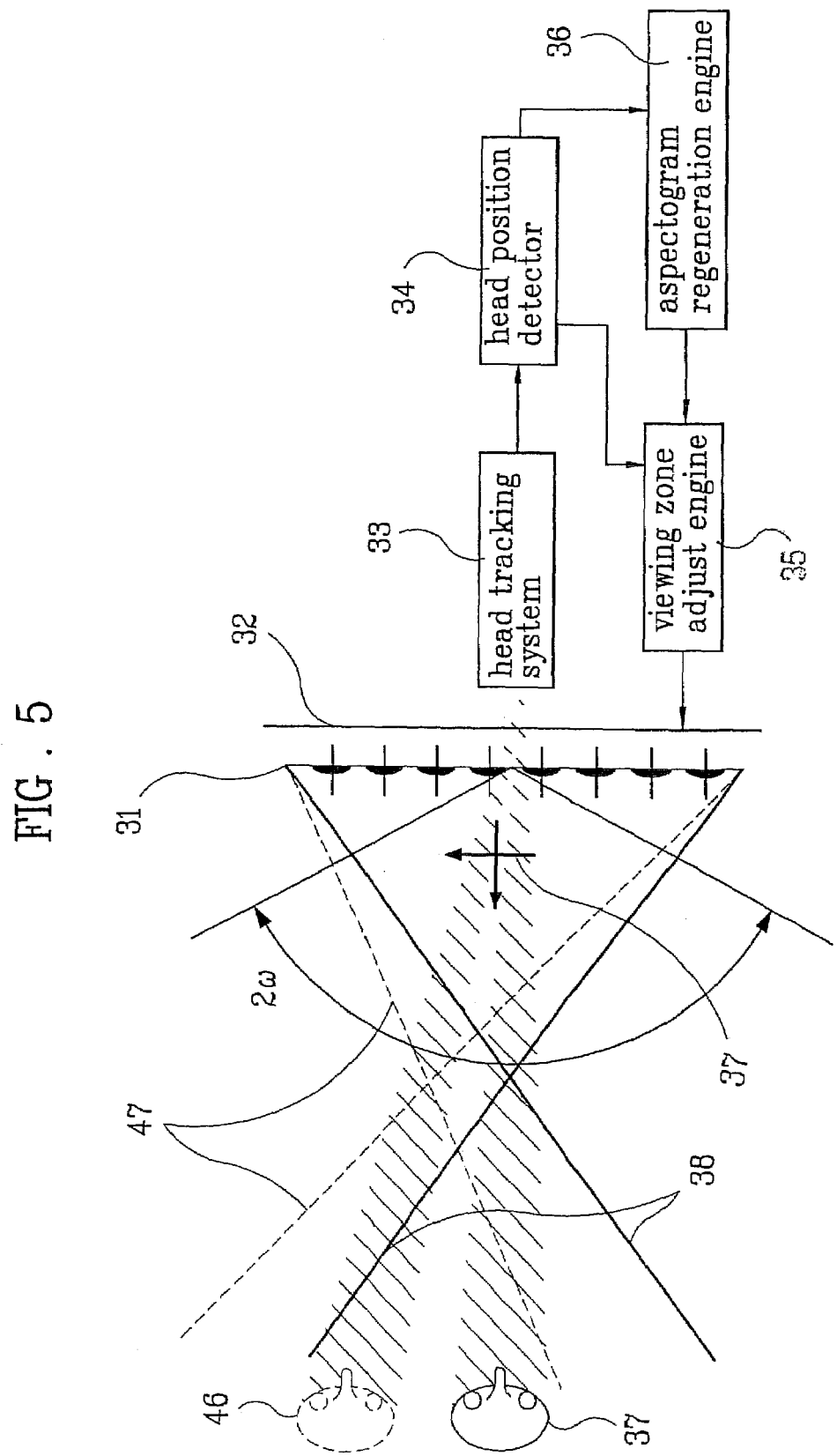

FIG. 5 shows an apparatus for displaying a three-dimensional image according to the third embodiment of the present invention. In the third embodiment of the present invention, both the viewing adjust engine 35 of the first embodiment and the aspectogram regeneration engine 36 of the second embodiment are additionally provided.

As shown in FIG. 5, an observer 37 observes a three-dimensional image 39 displayed by synthesizing the two-dimensional microimages provided on the screen 32 through the microlens array 31.

If the observer head 37 is within the main viewing zone 38, no signal occurs in the head position detector 34. However, if the observer head 46 moves to either the boundary of the main viewing zone or out of the boundary, the head tracking system 33 directly traces movement of the observer head and transmits a resultant signal to the head position detector 34.

The head position detector 34 calculates the position of the observer head in accordance with the signal of the head tracking system 33, and then transmits the calculated signal to both the aspectogram regeneration engine 36 and the viewing adjust engine 35.

The aspectogram regeneration engine 36 regenerates the two-dimensional microimages displayed on the screen 32 in accordance with the input signal in new microimages of which distortion is compensated. The viewing adjust engine 35 adjusts the viewing zone to yield an updated viewing zone 47 that corresponds to the position of a new observer head 46 by moving the new microimages displayed on the screen 32 in accordance with the input signal and of which distortion is compensated.

In the third embodiment which is the most preferred embodiment of the present invention, comfortable three-dimensional image having a wide viewing angle without distortion can be observed.

The apparatus for displaying a three-dimensional image according to the present invention is applicable to the microimages of all display devices such as an LCD, a PDP, a CRT, and a screen having a projection system.

As aforementioned, the apparatus and method for displaying a three-dimensional image according to the present invention has the following advantages.

Since the three-dimensional image having no distortion is provided even if the observer head moves out of the main viewing zone, a wide viewing angle can be obtained.

The above description will enable one skilled in the art to modify and revise the invention within the spirit not degrading the technical concept of the present invention. However, the technical scope of the present invention is not limited to the above description of the embodiment but shall be determined by the claims.

What is claimed is:

1. An apparatus for displaying a three-dimensional image, comprising:
    a detector for tracing movement of an observer head that observes a three-dimensional image, in real time and detecting a position of the observer head; and
    a compensator, the compensator capable of adjusting a viewing zone of the three-dimensional image that is synthesized from at least three two-dimensional microimages of a scene and compensating distortion of said three-dimensional image by manipulating an aspectogram comprising the at least three two-dimensional microimages of the scene in accordance with a signal input from the detector,
    wherein the apparatus synthesizes the aspectogram comprising the at least three two-dimensional microimages of the scene and regenerates them in the three-dimensional image of the scene.

2. The apparatus of claim 1, wherein the detector comprises a head tracking system which traces movement of the observer head in real time, and a head position detector for calculating the position of the observer head traced by the head tracking system.

3. The apparatus of claim 1, wherein the compensator comprises either a viewing adjust engine which adjusts the viewing zone of the three-dimensional image by moving the at least three microimages in accordance with a signal input from the head position detector, or a device which regenerates the at least three microimages of the scene in accordance with the signal input from the head position detector to compensate distortion of the three-dimensional image.

4. A method for displaying a three-dimensional image of a scene, the method comprising:
    tracing movement of an observer head that observes the three-dimensional image;
    calculating a position of the traced observer head; and
    adjusting a viewing zone of the three-dimensional image and compensating distortion of the three-dimensional image by manipulating at least three two-dimensional microimages, in accordance with the calculated position of the observer head, wherein the three-dimensional image of the scene is generated by synthesizing an aspectogram comprising the at least three two-dimensional microimages of the scene and regenerating the at least three microimages as the three-dimensional image.

5. The method of claim 4, wherein adjusting the viewing zone of the three-dimensional image comprises forming a new viewing zone centered relative to the moved observer head by moving the at least three two-dimensional microimages of the scene.

6. The method of claim 4, wherein compensating distortion of the three-dimensional image comprises regenerating the at least three two-dimensional microimages of the scene.

* * * * *